United States Patent
Englund (10) Patent No.: US 9,839,965 B2
(45) Date of Patent: Dec. 12, 2017

(54) CLAMPING DEVICE

(71) Applicant: SANDVIK INTELLECTUAL PROPERTY AB, Sandviken (SE)

(72) Inventor: Kjell Englund, Valbo (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 93 days.

(21) Appl. No.: 14/826,457

(22) Filed: Aug. 14, 2015

(65) Prior Publication Data

US 2016/0052065 A1 Feb. 25, 2016

(30) Foreign Application Priority Data

Aug. 19, 2014 (EP) .................................... 14181386

(51) Int. Cl.
*B23B 29/04* (2006.01)
*B23B 31/40* (2006.01)
*B23B 31/26* (2006.01)

(52) U.S. Cl.
CPC ........ *B23B 31/4006* (2013.01); *B23B 29/046* (2013.01); *B23B 31/265* (2013.01);
(Continued)

(58) Field of Classification Search
CPC ... Y10T 409/30952; Y10T 409/309408; Y10T 409/309352; B23B 2250/12;
(Continued)

(56) References Cited

U.S. PATENT DOCUMENTS 3,301,108 A * 1/1967 Heiner ................... B23B 31/40
                                                       279/2.12
4,981,057 A * 1/1991 von Haas ............. B23B 29/046
                                                       279/72

(Continued)

FOREIGN PATENT DOCUMENTS

CH            400723 A    10/1965
DE         10241860 A1 *  3/2004  ........... B23B 29/046
(Continued)

*Primary Examiner* — Sunil K Singh
*Assistant Examiner* — Paul M Janeski
(74) *Attorney, Agent, or Firm* — Corinne R. Gorski (57) ABSTRACT

A clamping device for releasably holding a tool holder shank is formed with an engagement bore in a rear end. The clamping device includes a housing having a mounting bore for receiving the tool holder shank; a drawbar being mounted reciprocally movable inside the housing and which in a forward end is provided with an engagement segment which is arranged to engage with an engagement formation inside the engagement bore of the tool holder shank, wherein the drawbar is in a rear portion formed with a drawbar aperture extending through the drawbar, and a cam shaft extending through the drawbar aperture and comprising a cam formation. The cam shaft is rotatably journalled in the housing and arranged to impart an axial displacement to the drawbar in relation to the housing by the cam formation when rotating the cam shaft. The cam shaft includes two identical cam formations, which are spaced apart by a recess, and the drawbar is on the inside of the aperture formed with a ridge on each side of the aperture which each fits in the recess of the cam shaft when rotating the same.

4 Claims, 7 Drawing Sheets

(52) U.S. Cl.
CPC ... *B23B 2231/0208* (2013.01); *B23B 2231/24* (2013.01); *B23B 2250/12* (2013.01); *B23B 2260/02* (2013.01); *B23B 2270/20* (2013.01); *Y10T 409/30952* (2015.01); *Y10T 409/309352* (2015.01); *Y10T 409/309408* (2015.01)

(58) Field of Classification Search
CPC ............ B23B 2260/02; B23B 2270/20; B23B 2231/0208; B23B 2231/24; B23B 31/265; B23B 29/046; B23B 31/4006
See application file for complete search history.

(56) References Cited

U.S. PATENT DOCUMENTS

| | | | |
|---|---|---|---|
| 5,340,248 A | 8/1994 | Engbergs | |
| 5,415,066 A | 5/1995 | Erickson et al. | |
| 5,452,631 A * | 9/1995 | Erickson | B23B 29/046 |
| | | | 409/234 |
| 5,851,091 A | 12/1998 | Klement | |
| 6,457,920 B1 * | 10/2002 | Kleiner | B23B 29/046 |
| | | | 279/155 |
| 8,312,615 B2 * | 11/2012 | Frota de Souza Filho | B23B 29/046 |
| | | | 29/525.01 |
| 2010/0140882 A1 | 6/2010 | McCormick et al. | |
| 2013/0034393 A1 * | 2/2013 | Hecht | B23B 29/046 |
| | | | 407/101 |

FOREIGN PATENT DOCUMENTS

| | | | | |
|---|---|---|---|---|
| DE | 102005015787 A1 * | 10/2006 | ........... | B23B 31/261 |
| DE | 102007043953 A1 * | 4/2009 | ........... | B23B 29/046 |
| DE | 102010052884 A1 | 6/2012 | | |
| DE | 102012108143 A1 * | 5/2014 | ........... | B23B 31/265 |
| JP | S56139807 A | 10/1981 | | |
| JP | 2008110456 A | 5/2008 | | |
| WO | WO 2012104671 A2 * | 8/2012 | ........... | B23B 29/046 |

* cited by examiner

CLAMPING DEVICE

RELATED APPLICATION DATA

This application claims priority under 35 U.S.C. §119 to EP Patent Application No. 14181386.5, filed on Aug. 19, 2014, which the entirety thereof is incorporated herein by reference.

TECHNICAL FIELD

The present disclosure relates to a clamping device for releasably holding a tool holder shank formed with an engagement bore in a rear end, including a housing having a forwardly facing surface and a mounting bore intersecting the forwardly facing surface and extending rearward therefrom for receiving the tool holder shank; a drawbar being mounted reciprocally movable inside the housing and which in a forward end is provided with an engagement device which is adapted to go into engagement with an engagement formation inside the engagement bore of the tool holder shank, the drawbar being in a rear portion formed with a drawbar aperture extending through the drawbar in a transverse direction in relation to a longitudinal axis of the same; and a cam shaft extending through the drawbar aperture and comprising a cam formation, wherein the cam shaft is rotatably journalled in the housing and adapted to impart an axial displacement to the drawbar in relation to the housing by the cam formation when rotating the cam shaft

BACKGROUND

Clamping devices are well known and widely used within the manufacturing industry for holding different kinds of tools for machining of work pieces of various materials. The clamping device may optionally be carried on a rotatable spindle, for holding e.g. a drill or a milling tool, or be unrotatable for holding e.g. a lathe tool.

One advantage with a clamping device of this kind is that it allows for a quick clamping of the tool, simply by rotating the cam shaft by about 100° to 200°, which has to effect that the tool will be drawn by a large force into the mounting bore of the housing and thereby be securely held by the clamping device. Also the releasing of the tool can be easily and rapidly performed by rotating the cam shaft in the reverse direction. Normally, the bore of the housing as well as the tool holder shank are also made slightly conical such that they are tapering in an axial direction rearward from the tool. In this way the connection between the tool and the clamping device also can be made totally free from any play which has to effect that the tool will be held in an exact position which allows for high precision machining by means of the tool.

However, one disadvantage with prior art clamping devices of this kind is that the drawbar is made with a comparatively large cross-sectional dimension such that it cannot, with the desirable cross-sectional measures of the tool holder shanks frequently being used, be inserted through the bore of the housing from its forward end. The reason why the drawbar has to be made with such a large cross-sectional dimension is that the drawbar aperture has to accommodate a cam shaft having a cam formation of a sufficient size in order to provide the desired displacement of the cam shaft and the desired force reduction for the operator performing the rotation of the cam shaft during clamping and releasing. However, in order to ensure sufficient tensile strength of the drawbar to withstand the desirable forces by which the tool holder shank is drawn into the shank bore, the remaining leg portions of the drawbar surrounding the drawbar aperture must be made with a sufficient cross-sectional dimension. An example of a prior art design of a clamping device will be described more in detail in connection with the hereinafter detailed description.

Accordingly, in order to position the drawbar in place when assembling the clamping device, the drawbar has up to the present been inserted from the rear end of the clamping device or a shank bore sleeve has been mounted in the forward end of the clamping device after that the drawbar has been inserted into the housing from the forward end. One consequence of this is that the overall dimensions of the clamping device cannot be made as small and slim as desired. Another consequence is that the clamping device will comprise extra mounting details which will render the clamping device more expensive to manufacture, both in respect of material costs and costs for performing the assembling.

SUMMARY

It is an aspect of the disclosure to provide a clamping device by which the drawbar is insertable into the housing through the bore of the housing from its forward end.

Accordingly, the drawbar can be made with an overall cross-sectional dimension, which is so small such that it can be inserted through the housing bore from the forward end of the housing. This is accomplished in that instead of a single continuous cam formation, as in prior art clamping devices, the cam shaft is provided with a recess which divides the cam formation into two separate cam formations. In this way, it is possible to provide the inside surfaces of the two leg portions, which interconnect the forward and rear portions of the drawbar with each other, with reinforcing ridges in the longitudinal direction of the drawbar, which ridges fit within the recess between the cam formations when rotating the cam shaft.

Due to the contribution from these ridges to the structural strength of the drawbar, the overall cross-sectional dimension of drawbar can be made so small such that the drawbar can be inserted through the housing bore from the forward end of the housing. The aperture for the cam shaft through the drawbar can be made with a larger free space in the axial direction than in the direction perpendicular to the axial direction, such that the largest dimension of the cam shaft can be oriented in the axial direction during insertion of the cam shaft through the aperture.

It is apparent that the device can be varied and modified in many different ways within the scope of the claim. For example, in the hereinafter described and illustrated exemplary embodiment, the mounting bore of the clamping device is conically formed and has a somewhat "triangular" or polygonal shape in cross section for clamping a tool holder having a similarly shaped mounting shank. However, the mounting bore could also have a different shape for clamping other types of mounting shanks. Moreover, in the exemplary embodiment the drawbar of the clamping device is provided with a separate detachable bolt in the forward end. This is advantageous inter alia because it makes it easier to arrange the fluid channels for cooling medium through the drawbar. However, the drawbar could of course also be formed with a forward directed stud of a suitable shape which is integrated with the rest of the drawbar.

In the description and claims throughout this application the term "forward" is used to indicate a direction or position towards the outer opening of the mounting bore through which the tool holder shank is inserted during clamping. In analogy, the terms "rear" or "rearward" are used to indicate a direction or position away from the outer opening of the mounting bore.

BRIEF DESCRIPTION OF THE DRAWINGS

An embodiment of a prior art clamping device as well as an exemplary embodiment of a clamping device according to the present disclosure, will hereinafter be described with reference to the accompanying drawings, in which.

DETAILED DESCRIPTION

Figures 1, 2, 3:
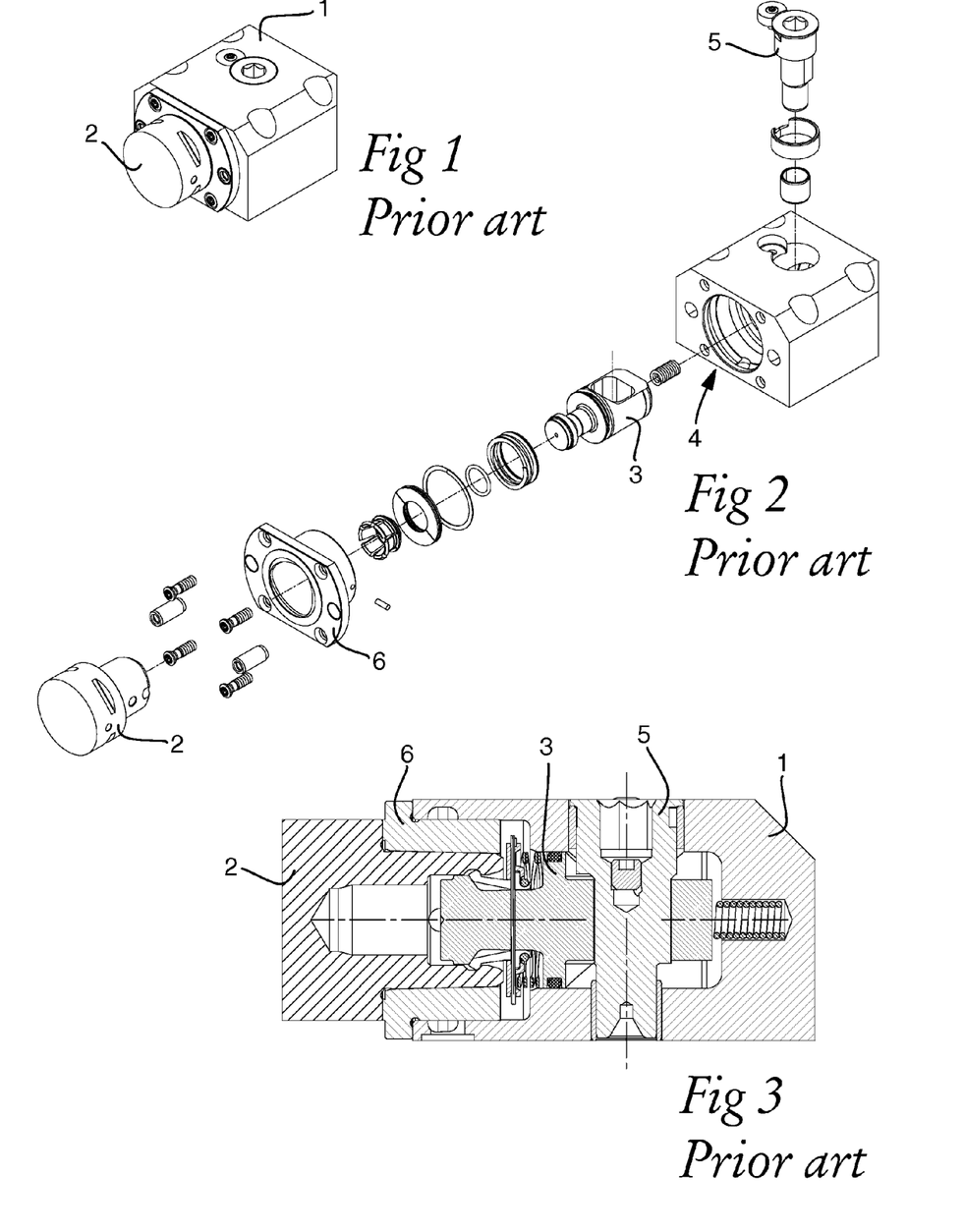
FIGS. 1-3 illustrate an embodiment of a prior art clamping device.

A prior art clamping device will now briefly be described by reference to FIGS. 1-3. This prior art clamping device is of an unrotatable kind, which is adapted to hold e.g. a lathe tool. As evident from FIG. 1 an outer housing of the clamping device 1 is generally box-shaped and is shown connected to a schematically illustrated tool holder 2. FIG. 2 is an exploded perspective view of the clamping device and the tool holder showing all the separate components comprised in the clamping device. One of the components is a drawbar 3 being inserted into the housing in a bore 4. The drawbar 3 regulates the clamping mechanism, the function of which is not described here, between a locked stage, in which the tool holder is firmly coupled to the clamping mechanism, and a released stage in which the tool holder is released from the clamping device. The regulating of the clamping mechanism is performed by displacement of the drawbar 3 in the axial direction of the bore 4 in the housing. The displacement of the drawbar is in its turn performed by rotating a cam shaft 5, which extend through the housing and through an aperture in the drawbar, and which is provided with a cam formation which as desired can act on a rear surface of the aperture through the drawbar, which will displace the drawbar rearward, or on a forward surface of the aperture, which accordingly will displace the drawbar forward.

However, due to the cam formation comprising a locking cam surface as well as a releasing cam surface, the cam shaft will have a rather large cross-sectional dimension and, accordingly, the aperture of the drawbar has to be formed with a correspondingly large cross sectional dimension in order to accommodate the cam shaft with its cam formation. As a result, the drawbar will be formed with rather large cross sectional dimensions since also the leg portions, which connect the forward and rear portions of the drawbar and are situated on a respective side of the drawbar aperture, must have a certain cross-sectional dimension in order to withstand the forces that will occur. This has the effect that with the commonly used dimensions of the mounting shanks for tools and tool holders, the drawbar cannot be inserted from the forward end of the clamping device since the passage will be too small. In the herein disclosed prior art clamping device this problem has been solved by mounting a separate sleeve 6 within the bore 4 of the housing which will define the shank bore for the mounting shank of the tool holder. Accordingly, the drawbar is mounted into the housing prior to mounting the shank bore sleeve 6.

One problem with such a solution is that the costs for manufacturing the clamping device will increase. Another problem is that using a separate shank bore sleeve will introduce one further component having its own manufacturing tolerances, which will deteriorate the precision of the machining work performed by means of the tool.

Figure 4:
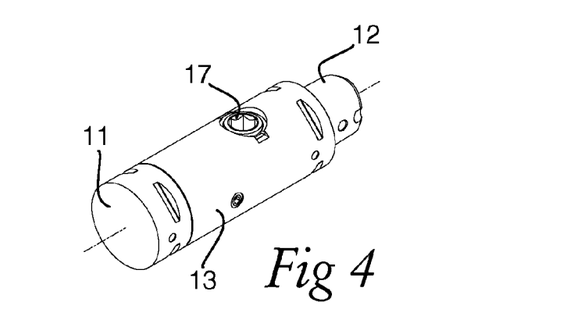
FIG. 4 is a perspective view of a clamping device according to the disclosure coupled to a tool holder.
Figure 5:
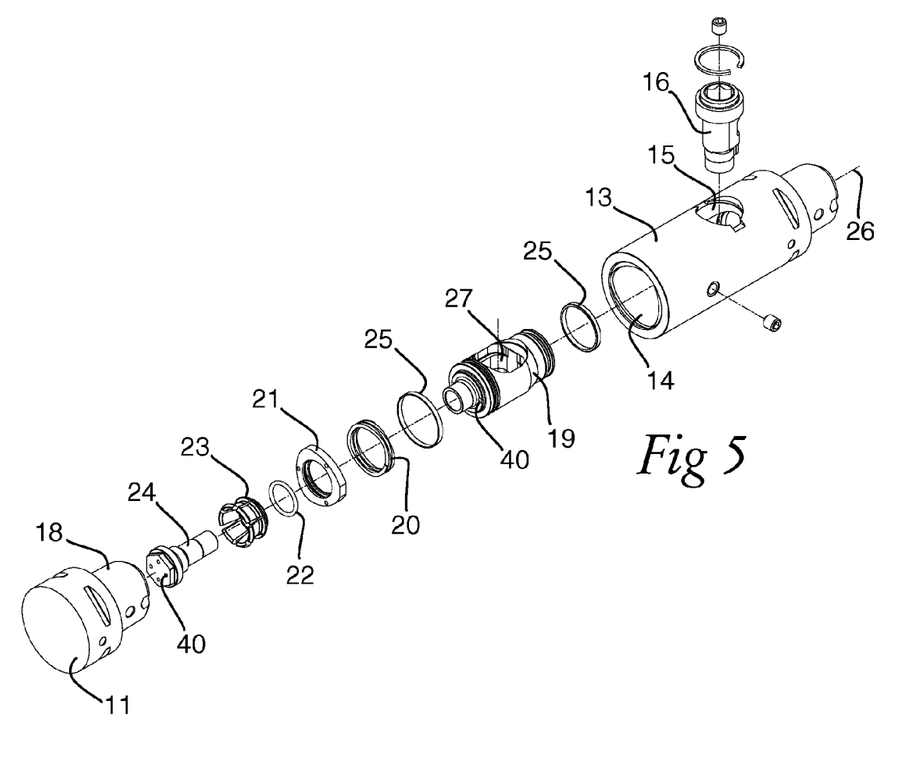
FIG. 5 is an exploded perspective view according to FIG. 4.

Reference is first made to FIG. 4 in which a clamping device 10 according to the disclosure and a schematic and cut-off tool holder 11 coupled to a forward end of the clamping device are illustrated in a perspective view. The tool holder is here schematically illustrated such that only its cut-off, rear end is shown but in practice some form of machining tool is connected to the tool holder, either integrated with the tool holder or as a separate connected part. In a rear end the clamping device is provided with a mounting shank 12, which is arranged to be connected to e.g. a rotating spindle (not shown) of a working machine or the like. The clamping device includes a somewhat elongated, cylindrical shaped housing 13 having an inner bore 14 (FIG. 5). On its envelope surface the housing is provided with a through-hole 15 for mounting of a cam shaft 16 through the housing, and which gives access to an engagement formation in form of a hex socket drive 17 at an end of the cam shaft.

FIG. 5 is an exploded perspective view of the clamping device and tool holder 11 according to FIG. 4 showing the various components forming part of the clamping device. Like the clamping device, also the tool holder is provided with a mounting shank 18, which in the illustrated embodiment both are of a kind disclosed in U.S. Pat. No. 5,340,248, comprising a conical shank having an axial bore and a somewhat "triangular" or polygonal, non-circular cross section, which is adapted to be drawn into a correspondingly shaped mounting bore 14. The conical shape ensures a connection free from play in the radial as well as the axial direction, whereas the "triangular" shape ensures an unrotatably fixation of the mounting shank in relation to the mounting bore. In order to draw the mounting shank 18 of the tool holder into the mounting bore of the clamping device, the latter is provided with a coupling mechanism including a drawbar 19, a compression spring 20, a retainer ring 21, an elastic o-ring 22, a plurality of engagement segments 23 and an end bolt 24 arranged within the bore 14 of the cylindrically formed housing 13. Two sealing rings 25 are also arranged between the drawbar and the inner bore of the housing. The through hole 15 is formed through the housing perpendicular to its center axis 26 and in an assembled state the cam shaft 16 is inserted into the through hole and through an aperture 27 in the drawbar.

Figure 6:
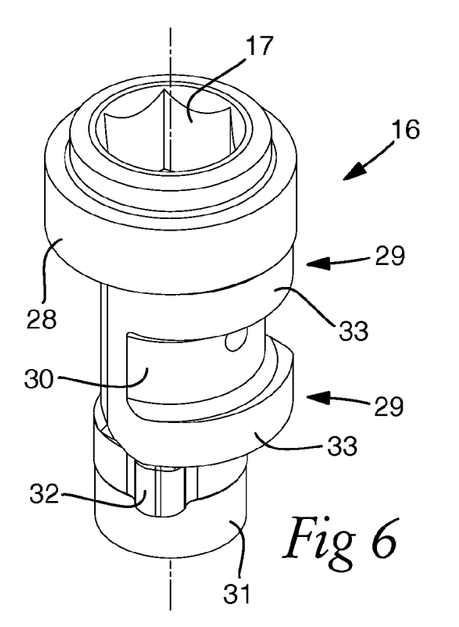
FIG. 6 is a perspective view of a cam shaft of the clamping device.
Figure 7:
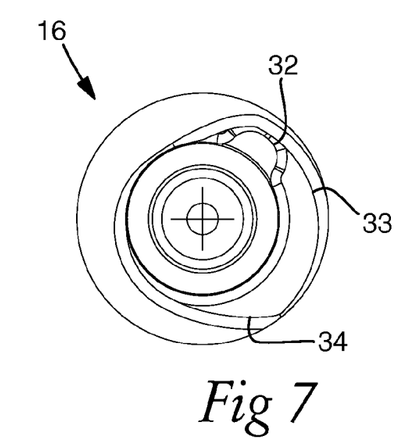
FIG. 7 is a view from below of the cam shaft in FIG. 6.

The cam shaft 16 is illustrated more in detail in a perspective view according to FIG. 6 and an end view in FIG. 7, which is seen from below in FIG. 6. In one end the cam shaft includes a head being formed with an engagement formation in form of a hex socket drive 17 arranged to be engaged by a hex socket wrench for setting of the cam shaft. Around the hex socket drive the head is provided with a large, circular surface which functions as a bearing surface 28 to be rotatably journalled at one side of the housing.

The middle portion of the cam shaft is formed with two identical cam formations 29 spaced apart by a recess 30, which extends in the circumferential direction of the cam shaft. In the other end the cam shaft is provided with a small, circular surface which functions as a bearing surface 31 to be rotatably journalled at the other side of the housing, as well as a stop lug 32 to limit the extent of rotation in relation to the housing. As can be seen from FIG. 7 the cam formations each have two cam surfaces. More particularly, one first, locking cam surface 33 is operative for displacing the drawbar rearwardly in the axial direction away from the mounting bore and locking the tool to the clamping device, and one second, releasing cam surface 34 being operative for displacing the drawbar forward in the axial direction towards the mounting bore and releasing the tool from the clamping device.

Figure 8:
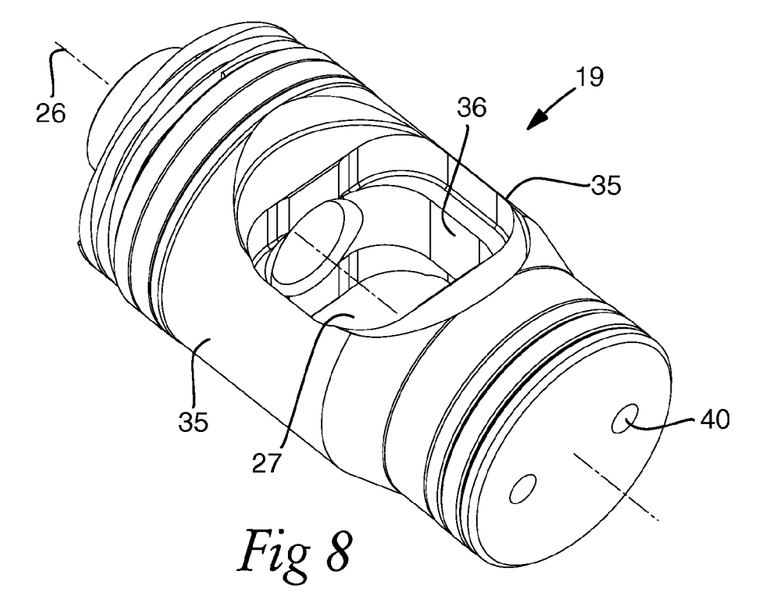
FIG. 8 is a perspective view of a drawbar of the clamping device.
Figure 9:
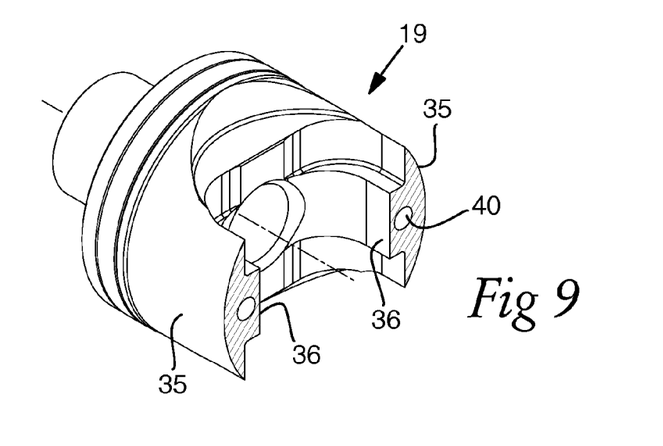
FIG. 9 is a cut-off perspective view of the drawbar in FIG. 8.
Figure 10:
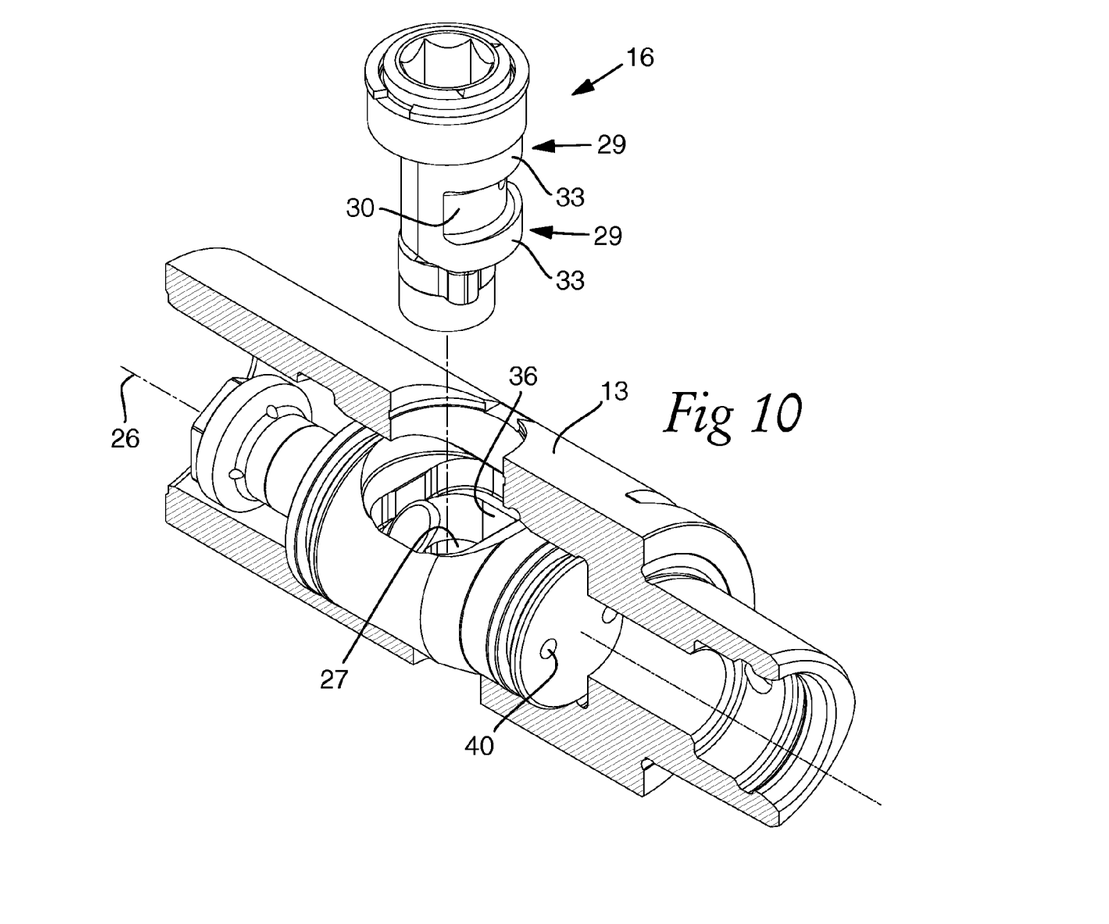
FIG. 10 is a partly cut-through perspective view of the housing, the drawbar and the cam shaft of the clamping device.

Referring to FIGS. 8 and 9, the drawbar 19 is illustrated in a complete perspective view and a cut-off perspective view, respectively. As with prior art clamping devices of this kind, an aperture 27 is formed through the drawbar in a direction perpendicular to its longitudinal axis, through which the cam shaft extends in the assembled state of the clamping device. However, according to the invention, the inside surfaces of two leg portions 35, which interconnect the forward and rear portions of the drawbar with each other, are provided with reinforcing ridges 36 in the longitudinal direction of the drawbar, which ridges fit within the recess 30 between the cam formations 29 when rotating the cam shaft. Due to the contribution from these ridges to the structural strength of the drawbar, the overall cross sectional dimension of drawbar can be made so small such that the drawbar can be inserted through the housing bore from the forward end of the housing. The aperture for the cam shaft through the drawbar is made with a larger free space in the axial direction 26 than in the direction perpendicular to the axial direction, such that the largest dimension of the cam shaft can be oriented in the axial direction during insertion of the cam shaft 16 through the aperture 27, as is illustrated in FIG. 10.

Figure 11:
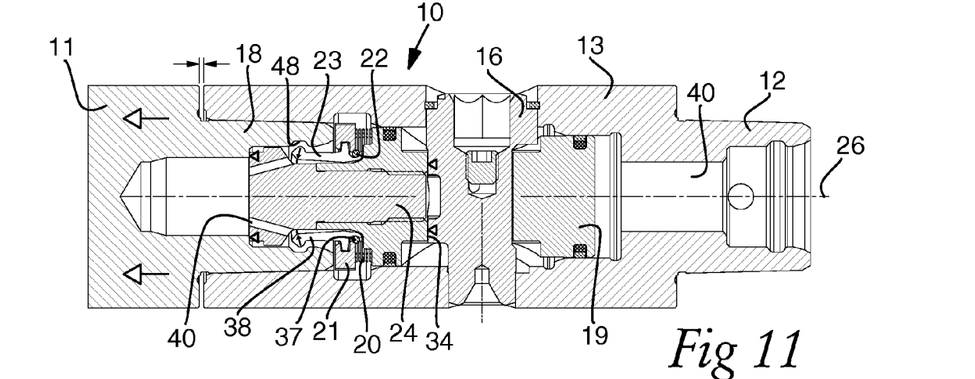
FIG. 11 is a longitudinal section through the clamping device and the tool holder, along the line XI-XI in FIG. 12, in an initial, unlocked stage.

FIG. 11 is a section along the longitudinal or center axis of the tool holder 11 and the clamping device 10 in an assembled state with all its components mounted in place. The clamping device is here in an initial stage when the tool shank 18 just has been inserted into the mounting bore but before the cam shaft 16 has been activated such that the tool shank has been coupled to the clamping device and drawn with a large force into the mounting bore of the housing 13. As can be seen, the end bolt 24 is screwed into a hole in the forward end of the drawbar 19 and concentric with its centre axis 26. Moreover, the engagement segments 23 are mounted around the drawbar and the end bolt in a space formed between an inner surface of an engagement bore in the rear end of the tool holder as well as the end bolt and the forward end of the drawbar. The engagement segments are held in place by means of an outward extending flange portion 37 of each engagement segments being in engagement with an inner groove inside the retainer ring 21, and the elastic o-ring 22 being positioned in an outward facing groove formation in the rear end of the engagement segments. The forward ends of the engagement segments are formed with outward directed engagement flanges 38, which are adapted to go into engagement with an inner engagement groove 48 inside the engagement bore of the tool holder but are in this initial stage out of engagement with the engagement groove. Moreover, the compression spring 20 is mounted between the drawbar 19 and the retainer ring 21 and act to displace the retainer ring and the engagement segments forwards. In this initial stage the cam shaft is rotated such that the releasing cam surfaces 34 act on the forward surface of the drawbar aperture and forces the drawbar forward.

Figure 12:
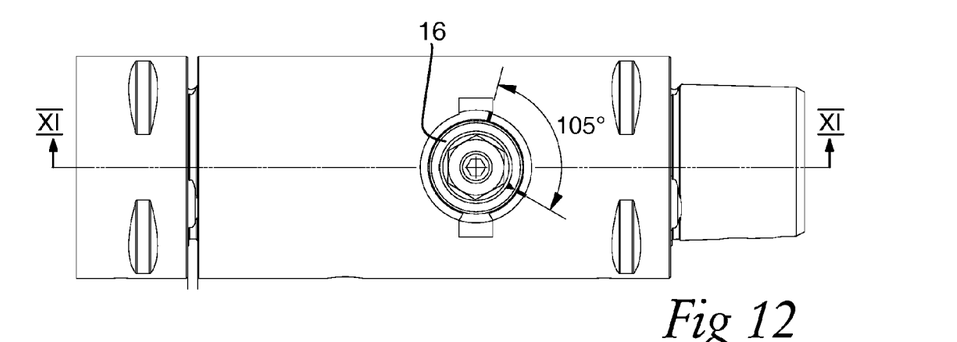
FIG. 12 is a side view according to FIG. 11.
Figure 13:
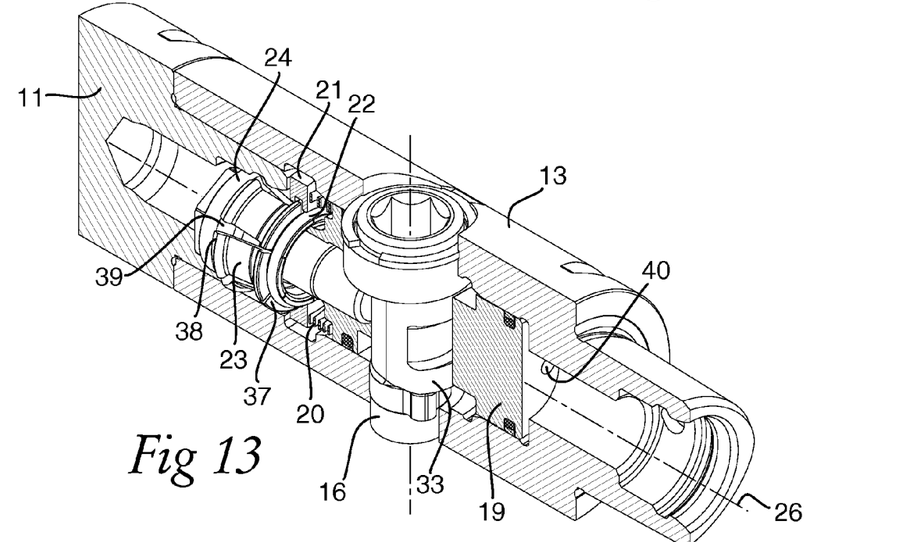
FIG. 13 is a partly cut-through perspective view according to FIGS. 11 and 12.

From the initial stage according to FIG. 11, the cam shaft can be rotated about 105° from a release position to a lock position, as is illustrated in FIG. 12, in which the locking cam surfaces 33 of the cam formations act on the rear surface of the drawbar aperture and forces the drawbar 19 rearward. This lock position is illustrated in a partly cut through perspective view along the center axis 26 of the clamping device and the tool holder according to FIG. 13 and a longitudinal section along the center axis according to FIG. 14. As can be seen from these figures the retainer ring 21 and the engagement segments 23 are still pushed forward toward the end surface of the tool holder shank 18 by means of the compression spring 20, while the drawbar 19 and the end bolt 24 are drawn rearward by means of the locking cam surfaces 33 of the cam shaft 16 acting on the rear surface of the drawbar aperture. This has to effect that the forward ends of the engagement segments will be displaced outwards by sliding on a rearward facing bevelled surface 39 on the end bolt 24. In this way the engagement flanges 38 of the engagement segments will be displaced outwards and go into engagement with the engagement groove inside the engagement bore of the tool holder such that the tool holder shank 18 will be drawn by means of the drawbar 19 into firm bearing against the surfaces of the mounting bore of the housing.

Figure 14:
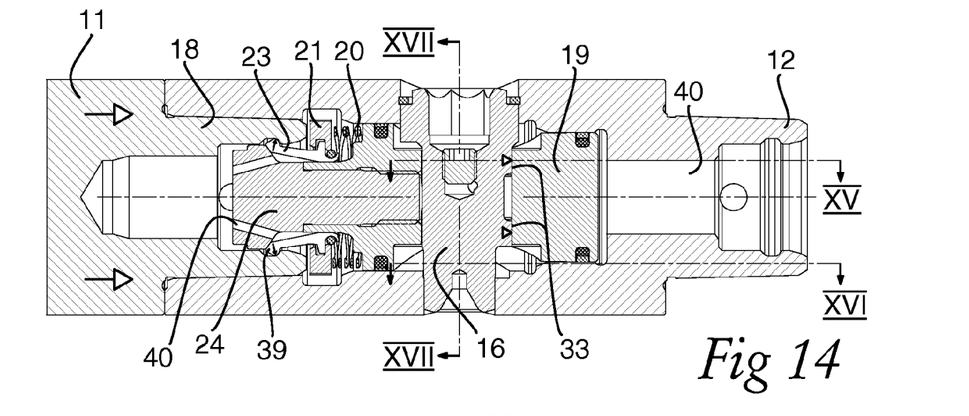
FIG. 14 is a longitudinal section through the clamping device and the tool holder, along the line XI-XI in FIG. 12, in an activated, locked stage.
Figure 15:
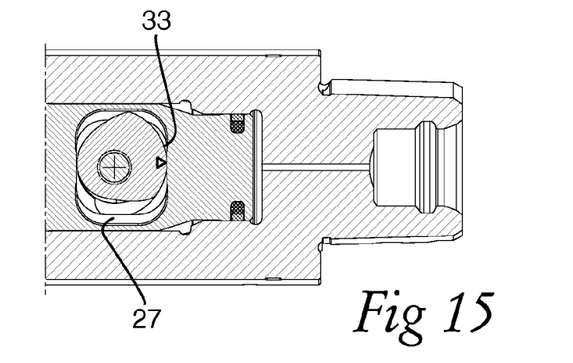
FIG. 15 is a longitudinal section along the line XV in FIG. 14.

FIG. 15 is a longitudinal section along the line XV in FIG. 14, showing the locking cam surface 33 acting on the rear surface of the drawbar aperture 27 and consequently forcing the drawbar 19 rearwards into the locked stage.

Figure 16:
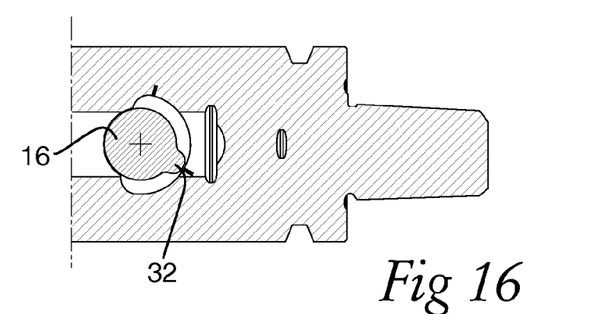
FIG. 16 is a longitudinal section along the line XVI in FIG. 14.

FIG. 16 is a longitudinal section along the line XVI in FIG. 14, showing the stop lug 32 of the cam shaft being in the locked position. However, the stop position is not an exactly predefined position since it can vary somewhat depending on the exact measures of e.g. the tool holder shank and the components being part of the locking mechanism of the clamping device.

Figure 17:
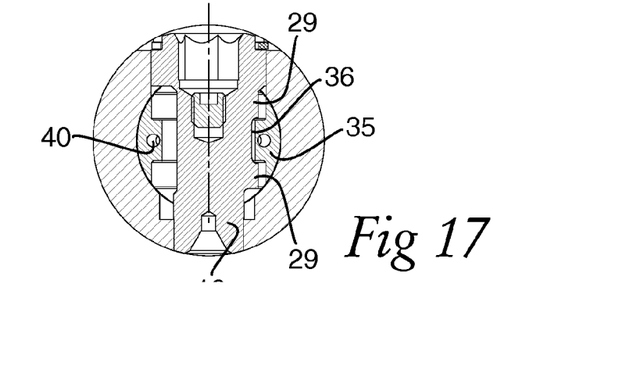
FIG. 17 is a cross-section along the line XVII-XVII in FIG. 14.

FIG. 17 is a cross section along the line XVII-XVII in FIG. 14 showing the reinforcing ridge 36 on the inside surface of one of the leg portions 35 of the drawbar being positioned within the recess between the cam portions 29 of the drawbar in the locked stage.

Figure 18:
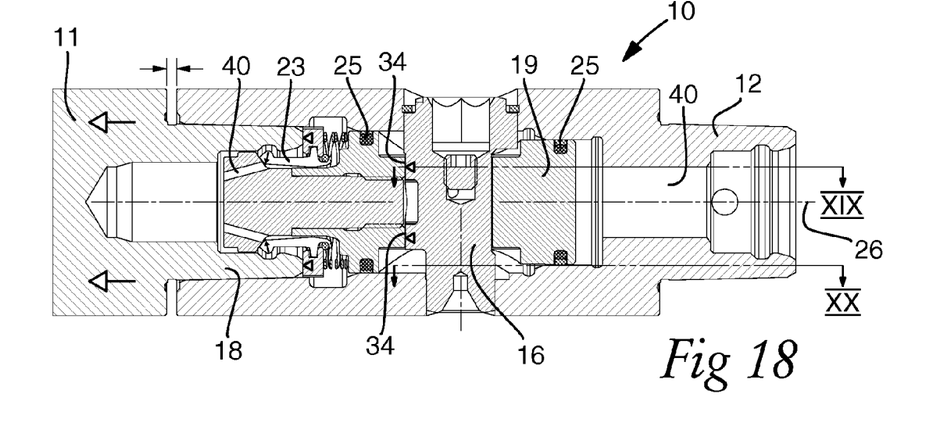
FIG. 18 is a longitudinal section through the clamping device and the tool holder, along the line XI-XI in FIG. 12, in a released, unlocked stage.

In FIG. 18 is illustrated a longitudinal section along the center axis 26 of the tool holder 11 and the clamping device 10 in a releasing stage of the same. As evident, the cam shaft 16 is rotated to the release position such that the releasing cam surface 34 of each cam portion is acting on the forward surface of drawbar aperture and the drawbar 19 is thus forced forward. Accordingly, the engagement segments 23 will be displaced inward such that their engagement will be disengaged from the engagement groove on the inside of the engagement bore of the tool holder shank, which now therefore can be drawn out from the mounting bore of the housing 10.

Figure 19:
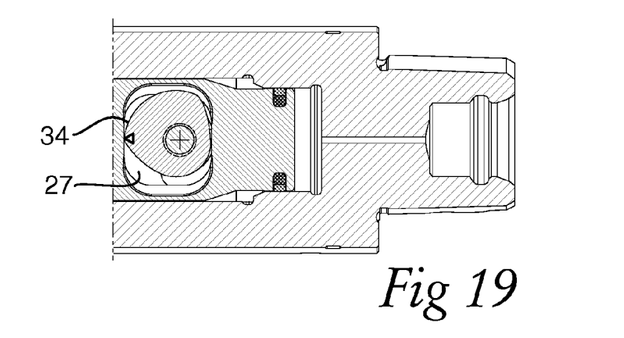
FIG. 19 is a longitudinal section along the line XIX in FIG. 18.

FIG. 19 is a longitudinal section along the line XIX in FIG. 18, showing a releasing cam surface 34 of the cam shaft acting on the forward surface of the drawbar aperture 27 and forcing the drawbar in the forward direction.

Figure 20:
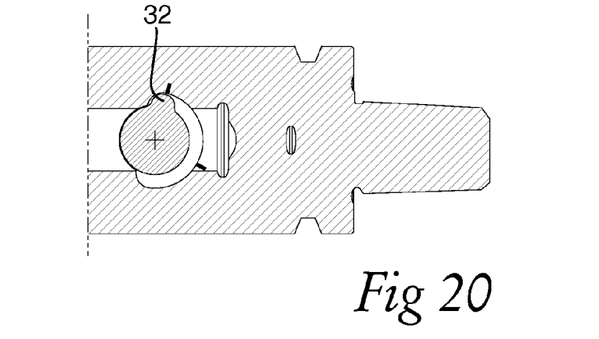
FIG. 20 is a longitudinal section along the line XX in FIG. 18.

FIG. 20 is a longitudinal section along the line XX in FIG. 18, showing the stop lug 32 of the cam shaft being in a releasing position. Unlike the locking position the releasing position is a distinct position defined by a recess formed in the housing, since it is not desirable that the cam shaft should be able to rotate further than to that position.

The illustrated embodiment of the invention is also provided with a system of fluid channels for cooling medium, which optionally can be liquid or gas, for allowing distribution of cooling medium from the mounting shank to the not disclosed machining tool in the outer end of the tool holder. The fluid channels, which commonly are indicated by reference number 40, extend from the rear end of the mounting shank 12 of the housing to the bore of the housing, as can be seen from FIGS. 11, 14 and 18, through the drawbar 19 and its leg portions 35, as can be seen from FIGS. 8, 9, 10 and 17, and debouch in the forward end of the drawbar as can be seen from FIG. 5. The cooling medium can then flow through the engagement mechanism of the clamping device and thereafter reach the engagement bore of the tool holder through channels formed in the end bolt as can be seen from FIGS. 5, 10, 11 and 18. One advantage with a system of fluid channels arranged like this is that the cooling medium will never pass the drawbar aperture and the cam shaft positioned therein, such that the cam shaft does not have to be sealed for avoiding leakage of cooling fluid between the cam shaft and the housing. Instead, it is sufficient to arrange sealing rings 25 between the drawbar and the inner bore of the housing on each side of the drawbar aperture.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A clamping device for releasably holding a tool holder shank formed with an engagement bore in a rear end, comprising:
   a housing having a forwardly facing surface and a mounting bore intersecting the forwardly facing surface and extending rearward therefrom for receiving the tool holder shank;
   a drawbar mounted reciprocally movable inside the housing and which in a forward end is provided with an engagement segment arranged to engage with an engagement formation inside the engagement bore of the tool holder shank, the drawbar being in a rear portion formed with a drawbar aperture extending through the drawbar in a transverse direction in relation to a longitudinal axis of the same, an inside surface of the drawbar including a pair of leg portions, each leg portion having a reinforcing ridge extending parallel to the longitudinal axis; and
   a cam shaft extending through the drawbar aperture and including a cam formation, wherein the cam shaft is rotatably journalled in the housing and arranged to impart an axial displacement to the drawbar in relation to the housing by the cam formation when rotating the cam shaft, wherein the cam shaft includes two identical cam formations, which are spaced apart by a recess, and which each cam formation comprises a first cam surface operable to urge the drawbar rearward to a locked position, in which it firmly locks the tool holder shank to the clamping device, and a second cam surface operable to positively displace the drawbar forward to an unlocked position in which the tool holder shank is releasable from the clamping device, wherein the reinforcing ridges are located on each side of the aperture in a direction in parallel to a longitudinal axis of the drawbar, each ridge fitting in the recess of the cam shaft which divides the cam formation into the separate first and second cam formations when rotating the same.

2. The clamping device according to claim 1, wherein the drawbar is provided with an end bolt in the forward end of the drawbar.

3. The clamping device according to claim 2, wherein fluid channels for cooling medium are arranged through the end bolt.

4. The clamping device according to claim 1, further comprising fluid channels for cooling medium which extend from the rear end of the clamping device to the inner bore of the housing as well as through the drawbar and through its leg portions and debouche in the forward end of the drawbar, wherein sealing rings are arranged between the drawbar and the inner bore of the housing on each side of the drawbar aperture.

* * * * *